(12) United States Patent
Luo et al.

(10) Patent No.: US 10,175,434 B2
(45) Date of Patent: Jan. 8, 2019

(54) COUPLING PLATFORM OF SFP+COB MODULE ASSEMBLY FOR PHOTOELECTRIC COMMUNICATION

(71) Applicant: Wuhan Telecommunication Devices Co., Ltd., Wuhan, Hubei Province (CN)

(72) Inventors: Yaoxin Luo, Wuhan (CN); Benqing Quan, Wuhan (CN); Fanrong Gao, Wuhan (CN)

(73) Assignee: Wuhan Telecommunication Devices Co., Ltd., Wuhan (CN)

( * ) Notice: Subject to any disclaimer, the term of this patent is extended or adjusted under 35 U.S.C. 154(b) by 0 days.

(21) Appl. No.: 15/719,548

(22) PCT Filed: Dec. 29, 2015

(86) PCT No.: PCT/CN2015/099419
§ 371 (c)(1),
(2) Date: Sep. 29, 2017

(87) PCT Pub. No.: WO2017/075885
PCT Pub. Date: May 11, 2017

(65) Prior Publication Data
US 2018/0356606 A1   Dec. 13, 2018

(30) Foreign Application Priority Data
Nov. 6, 2015   (CN) .......................... 2015 1 0746579

(51) Int. Cl.
*G02B 6/26* (2006.01)
*G02B 6/42* (2006.01)

(52) U.S. Cl.
CPC ........... *G02B 6/4226* (2013.01); *G02B 6/428* (2013.01); *G02B 6/4244* (2013.01); *G02B 6/4284* (2013.01); *G02B 6/4292* (2013.01)

(58) Field of Classification Search
CPC .... G02B 6/4226; G02B 6/4244; G02B 6/428; G02B 6/4292; G02B 6/4284
See application file for complete search history.

(56) References Cited

U.S. PATENT DOCUMENTS

2007/0175563 A1   8/2007   Sato et al.
2011/0317963 A1   12/2011   Rocher
(Continued)

FOREIGN PATENT DOCUMENTS

CN   1469148   1/2004
CN   1014918816   8/2009
(Continued)

OTHER PUBLICATIONS

Notification of Transmittal of the International Search Report and the Written Opinion of the International Searching Authority, PCT/CN2015/099419, dated Aug. 2, 2016.

*Primary Examiner* — Ellen Kim
(74) *Attorney, Agent, or Firm* — Gokalp Bayramoglu

(57) ABSTRACT

A coupling platform of SFP+COB module assembly for photoelectric communication, which comprises a lens clamping part, a PCB clamping part, a coupling adjustment part and a supporting part, wherein the lens clamping part comprises a clamping seat, a movable part, a cam, a connecting seat, a fiber optic patch cord limit plate and a fiber optic patch cord; the PCB clamping part comprises a PCB socket, a clamping jaw and a gas jaw The main body of the coupling adjustment part is a multi-shaft fine-tuning rack. and the supporting part comprises a cushion block and a platform bottom plate. The clamping seat, the movable part and the cam are combined, thereby enabling the cam to drive the movable part to slide up and down in a clamping groove of the clamping seat during rotation. When the movable part moves to an upper end, an LC light port of a plastic lens can be inserted into the clamping seat without obstruction. When (Continued)

the movable part moves to a lower end, the LC light port of the plastic lens is limited by a limiting gap of the movable part. When the cam rotates, the cam drives the movable part to slide to the upper end to replace the plastic lens with a new plastic lens. Accordingly, the present invention solves the technical problems of enabling the plastic lens to be easily positioned and bind a PCB, thereby achieving the beneficial effects of improving the quality and the efficiency and reducing the manufacture cost.

10 Claims, 7 Drawing Sheets

(56) References Cited

U.S. PATENT DOCUMENTS

| | | | | |
|---|---|---|---|---|
| 2013/0250980 | A1* | 9/2013 | Daiber | H01S 5/0085 |
| | | | | 372/20 |
| 2015/0341066 | A1* | 11/2015 | Hsieh | H04B 1/38 |
| | | | | 361/715 |
| 2015/0381278 | A1* | 12/2015 | Meadowcroft | G02B 6/4214 |
| | | | | 250/208.2 |

FOREIGN PATENT DOCUMENTS

| | | |
|---|---|---|
| CN | 204229007 | 3/2015 |
| CN | 104820266 | 8/2015 |

\* cited by examiner

COUPLING PLATFORM OF SFP+COB MODULE ASSEMBLY FOR PHOTOELECTRIC COMMUNICATION

This application claims priority to Patent Cooperation Treaty (PCT) Application No. PCT/CN2015/099419 filed Dec. 29, 2015, which claims priority to Chinese Patent Application No. 201510746579.0 filed Nov. 6, 2015. The contents of the above identified applications are incorporated herein by reference in their entireties.

TECHNICAL FIELD

The present invention relates to the technical field of optical communication, and in particular to a coupling platform of SFP+COB module assembly for photoelectric communication.

BACKGROUND ART

With the development of the global optical communication network, the communication rate has been continuously improved, more and more original cables have been replaced by optical fibers, the requirements on high speed and miniaturized packaged short range optical modules have increased, and the increasing demand causes the optical communication assemblies with multiple functions, good flexibility and low cost to become the inevitable trend of development.

The COB (Chip On Board) solution of the modules used by the photoelectric communication is a newer technical solution. The solution directly couples the lens with the adapters and the PCB board pasted with IC chip and fixes them by adhesive. There is no mature coupling and assembly process in the industry, so people must develop a set of practical and efficient coupling platform in order to achieve the scale production of such modules.

TECHNICAL SOLUTION

In order to solve the above technical problems, the main purpose of the present invention is to provide a coupling platform of SFP+COB module assembly for photoelectric communication.

In order to achieve the above object, the technical solution of the present invention is that: the present invention provides a coupling platform of SFP+COB module assembly for photoelectric communication, which comprises a lens clamping part, a PCB clamping part, a coupling adjustment part and a supporting part, wherein the lens clamping part comprises a clamping seat, a movable part, a cam, a connecting seat, a fiber optic patch cord limit plate and a fiber optic patch cord; the PCB clamping part comprises a PCB socket, a clamping jaw and a gas jaw; the main body of the coupling adjustment part is a multi-shaft fine tuning rack; and the supporting part comprises a cushion block and a platform bottom plate, wherein: the clamping seat, the movable part and the cam are combined, thereby enabling the cam to drive the movable part to slide up and down in a clamping groove of the clamping seat during rotation; when the movable part moves to an upper end, an LC light port of a plastic lens can be inserted into the clamping seat without obstruction; when the movable part moves to a lower end, the LC light port of the plastic lens is limited by a limiting gap of the movable part; and when the cam rotates, the cam drives the movable part to slide to the upper end to replace the plastic lens with a new plastic lens, so as to realize cyclic operation.

Preferably in the embodiment of the present invention, the clamping seat comprises a clamping sliding groove arranged at one side which allows the movable part to slide up and down inside, a stepped hole arranged on the same side which accommodates the LC adapters of the plastic lens to insert inside and to be limited, a through hole arranged on the top which contains the cam inside, and a screw hole arranged on the bottom, and the back of the clamping sliding groove is provided with a screw hole which allows a screw to run through to the fiber optic patch cord limit plate.

Preferably in the embodiment of the present invention, the movable part is a plate with a round square hole matching with the cam in the middle, the cam will drive the movable part to slide up and down in the clamping sliding groove during rotation, and the limiting gap matches with the stepped hole to limit the plastic lens and comprises a guide corner edge arranged along the edge of the limiting gap.

Preferably in the embodiment of the present invention, the cam comprises a rotation shaft matching with the through hole, the rotation shaft is provided with a circular lug which is eccentric relative to the rotation shaft, an adjusting gap at the right end relative to the circular lug, the adjusting gap is provided with a wrench, and a clamping groove is arranged at the other end of the rotation shaft that is away from the adjusting gap.

Preferably in the embodiment of the present invention, the connecting seat is provided with a stretching plate with an installation hole matching with the multi-shaft fine tuning rack, and a connecting plate used to connect with the clamping seat, wherein the connecting plate is provided with a stepped hole matching with the screw hole on the bottom of the clamping seat, a sliding groove is arranged on the bottom of the connecting seat, and the sliding groove joints with a sliding rail on the plane of the multi-shaft fine tuning rack.

Preferably in the embodiment of the present invention, an installation hole is arranged on the upper side of the fiber optic patch cord limit plate, and is used to fix with the clamping seat, and an inverted U-shaped bayonet is arranged on the lower side of the fiber optic patch cord limit plate, and is used to install an optical fiber fiber optic patch cord.

Preferably in the embodiment of the present invention, the optical fiber fiber optic patch cord comprises a metal handle and a ceramic rod, the tail end of the metal handle is connected with an optical fiber, and the metal handle is sleeved with a spring.

Preferably in the embodiment of the present invention, a groove is arranged on the upper side of the PCB socket, limiting bosses are arranged on both sides of the groove, a limiting column is arranged near the groove and beside the limiting boss on one side, a horizontal plate having a groove-shaped hole with steps is arranged on the lower side of the PCB socket, and the horizontal plate and the limiting bosses are connected by a vertical plate with an stepped hole.

Preferably in the embodiment of the present invention, the clamping jaw comprises a wedge clamping, a groove and a through hole, wherein the wedge clamping is arranged on the top of the clamping jaw and has an inclined plane, the groove matching with the gas jaw is arranged on the lower surface on the bottom of the clamping jaw, and the upper surface opposite to the lower surface is provided with a through hole containing a nail running through the lower surface.

Preferably in the embodiment of the present invention, the top of the cushion block is provided with a screw hole used to connect with the PCB socket, one side of the screw hole is provide with a flange, the bottom of the cushion block is provided with a positioning plate with an extending part, the extending part is provided with a groove-shaped hole, and the groove-shaped hole is penetrated by a screw and joins with a relevant structure of the platform bottom plate.

Compared with the prior art, the prevent invention has the beneficial effects that: when the lens and the PCB of the SFP+COB assembly are being positioned, coupling adjustment with high precision can be achieved. The efficiency and the quality can be provided support for positioning and bonding with PCB plate. Furthermore, the coupling platform has simple process and low cost, and can be used for mass production, and the process in the practical operation is easy to study and has high adjusting precision and speedy coupling.

BRIEF DESCRIPTION OF THE DRAWINGS

FIG. 5b is the structural schematic diagram of the back surface of FIG. 5a.

FIG. 5c is the structural schematic diagram of the bottom surface of FIG. 5a.

FIG. 7b is the structural schematic diagram of the top view of FIG. 7a.

FIG. 7c is the structural schematic diagram of the bottom view of FIG. 7a.

FIG. 8b is the structural schematic diagram of the rear view of FIG. 8a.

DETAILED DESCRIPTION OF THE PREFERRED EMBODIMENTS

Figure 1:
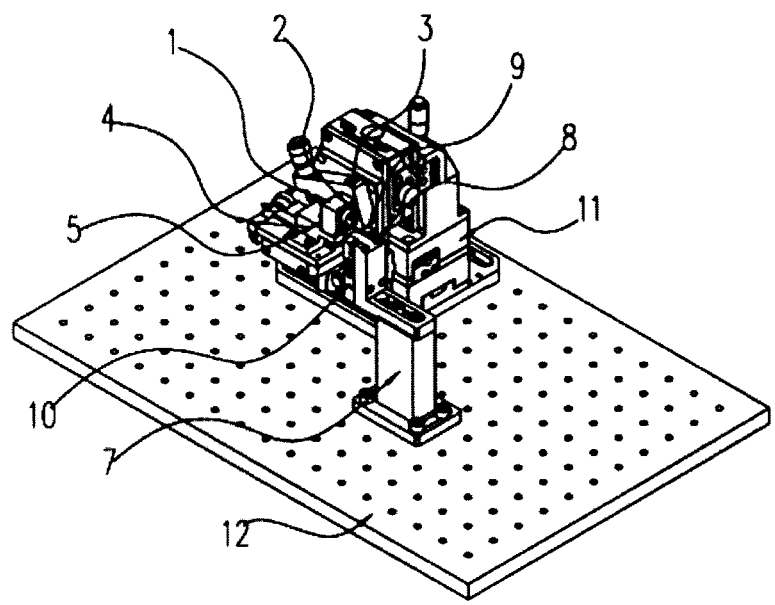
FIG. 1 is the structural schematic diagram of the assembling of the embodiment.

In the following, the present invention will be described in further detail with reference to the drawings and the detailed embodiments. Examples of the embodiments are shown in the drawings, wherein the same or similar labels represent the same or similar elements or components having the same or similar functions from beginning to end. The following embodiments illustrated with reference to the drawings are exemplary, only used to explain the technical solutions of the present invention, and should not be understood as a limitation to the present invention.

In the description of the present invention, the orientation or position relations indicated by the terms "inside", "outside", "longitudinal", "lateral", "upper", "lower", "top", "bottom", "front", "back", "left", "right" and so on are the orientations or positions based on the drawings, are only used to facilitate the describing of the present invention, rather than requiring the present invention to be manufactured or operated in the specific orientations, and thus should not be understood as a limitation to the present invention.

Referring to FIG. 1, the present invention provides a coupling platform of SFP+COB module assembly for photoelectric communication, wherein the platform comprises a lens clamping part, a PCB clamping part, a coupling adjustment part and a supporting part.

Figure 2:
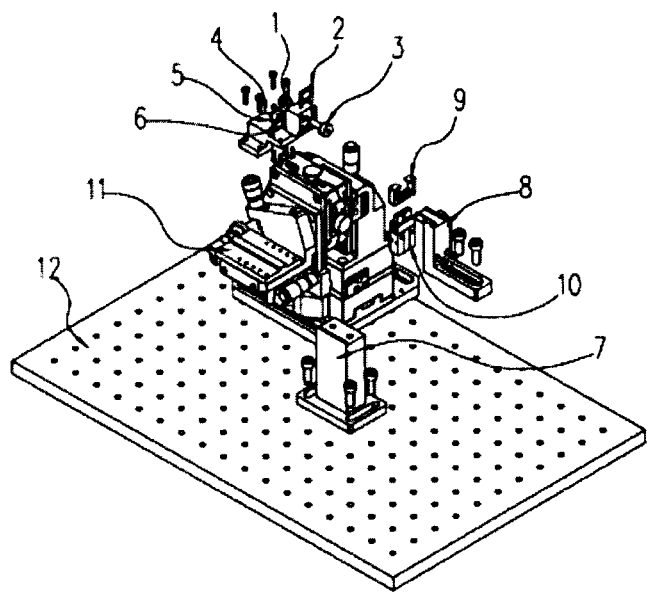
FIG. 2 is the structural schematic diagram of decomposition of the key structures in FIG. 1.
Figure 3:
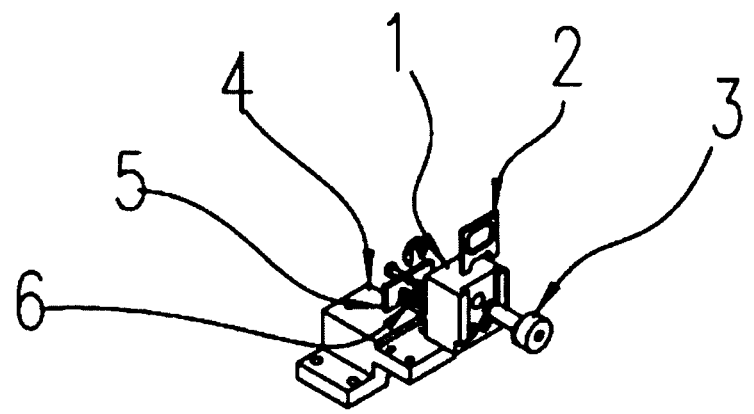
FIG. 3 is the structural schematic diagram of the lens clamping part in FIG. 2.

Referring to FIG. 1 and referring to FIG. 2 and FIG. 3, the lens clamping part comprises a clamping seat 1, a movable part 2, a cam 3, a connecting seat 4, a fiber optic patch cord limit plate 5 and a fiber optic patch cord 6.

Figure 4:
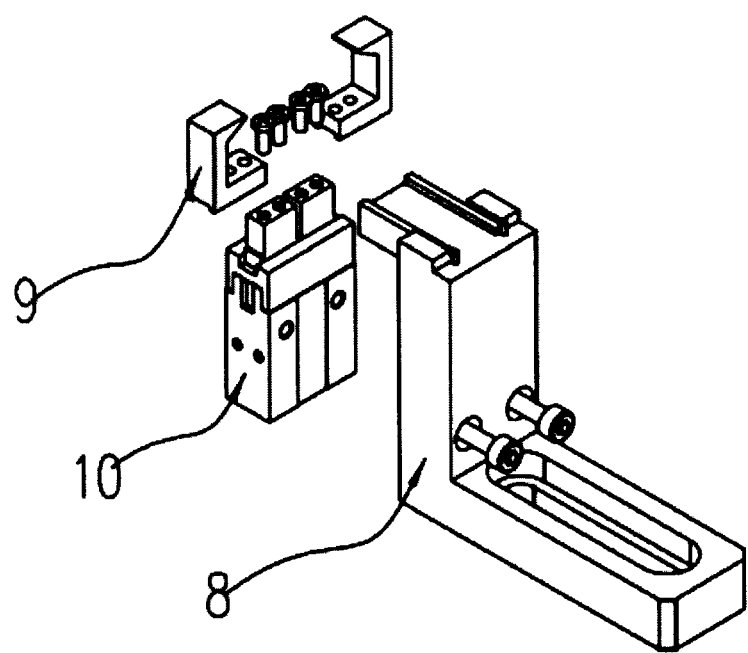
FIG. 4 is the structural schematic diagram of the PCB clamping part in FIG. 2.

Referring to FIG. 4, the PCB clamping part comprises a PCB socket 8, a clamping jaw 9 and a gas jaw 10.

Referring to FIG. 1 and FIG. 2 again, the main body of the coupling adjustment part is a multi-shaft fine tuning rack 11. The supporting part comprises a cushion block 7 and a platform bottom plate 12.

In the embodiment of the present invention, the coupling platform is assembled and the motion forms after assembled include:

As shown in FIG. 1, FIG. 2, and FIG. 3 to FIG. 9, the clamping seat 1, the movable part 2 and the cam 3 are combined, thereby enabling the cam 3 to drive the movable part 2 to slide up and down in a clamping groove of the clamping seat 1 during rotation. When the movable part 2 moves to an upper end, an LC light port of a plastic lens can be inserted into the clamping seat 1 without obstruction. When the movable part 2 moves to a lower end, the LC light port of the plastic lens is limited by a limiting gap 2-2 of the movable part 2, so as to complete the clamping of the lens. When the cam 3 rotates, it drives the movable part 2 to slide to the upper end to replace the plastic lens with a new plastic lens.

Figure 5A:
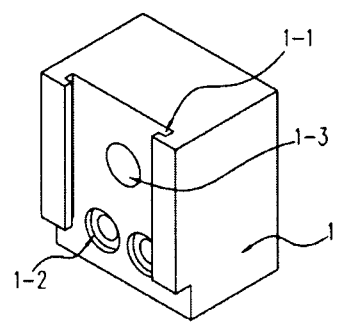
FIG. 5a is the structural schematic diagram of the clamping seat in FIG. 3.
Figure 5B:
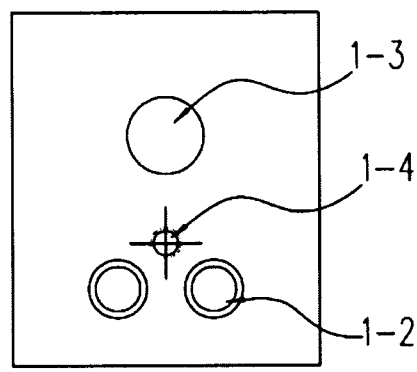
Figure 5C:
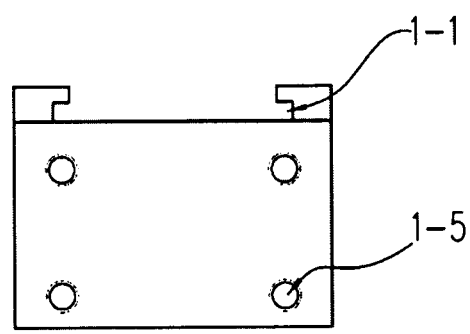

In this embodiment, one side of the clamping seat 1 (as shown in FIGS. 5a, 5b and 5c) is provided with a clamping sliding groove 1-1, which allows the movable part 2 to slide up and down inside, and the same side is provided with two stepped holes 1-2 which accommodate the two LC adapters of the plastic lens to insert inside, so as to realize limiting. The top of the clamping seat 1 is provided with 1 through hole 1-3, which contains the cam 3 to rotate inside. The back of the clamping sliding groove 1-1 is provided with a screw hole 1-4, which is fixed with the fiber optic patch cord limit plate 5 by a screw. The bottom of the clamping seat 1 is provided with a screw hole 1-5.

Figure 6:
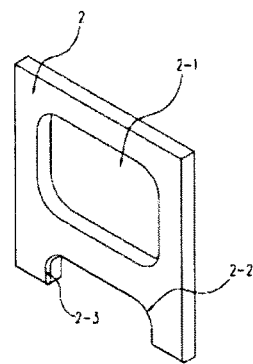
FIG. 6 is the structural schematic diagram of the movable part in FIG. 3.

In this embodiment, the movable part 2 (as shown in FIG. 6) is a plate with a round square hole 2-1 matching with the cam 3 in the middle. The cam 3 will drive the movable part 2 to slide up and down in the clamping sliding groove 1-1 during rotation. The limiting gap 2-2 matches with the stepped holes 1-2 to limit the plastic lens, and comprises a guide corner edge 2-3 arranged along the edge of the limiting gap, so as to conveniently place the plastic lens without damaging the plastic lens.

Figure 7A:
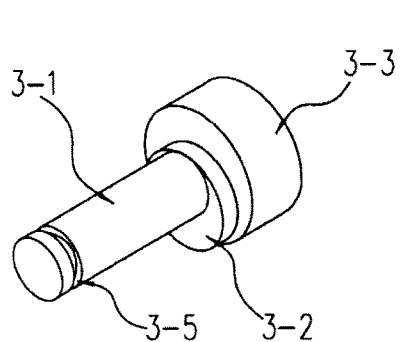
FIG. 7a is the structural schematic diagram of the cam in FIG. 3.
Figure 7B:
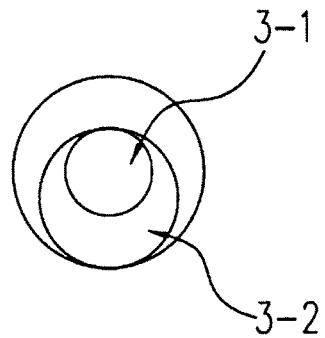
Figure 7C:
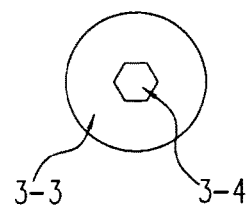

In this embodiment, the cam 3 (as shown in FIG. 7a, FIG. 7b and FIG. 7c) comprises a rotation shaft 3-1 matching with the through hole 1-3. The rotation shaft 3-1 is provided with a circular lug 3-2 which is eccentric relative to the rotation shaft 3-1, and an adjusting gap 3-3 on the right end relative to the circular lug 3-2. The adjusting gap 3-3 is provided with a wrench 3-4. A clamping groove 3-5 is arranged on the other end of the rotation shaft 3-1 that is away from the adjusting gap 3-3.

Figure 8A:
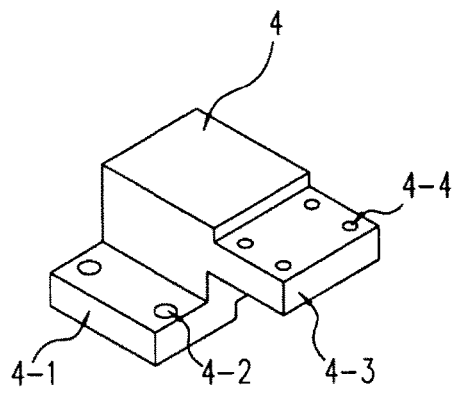
FIG. 8a is the structural schematic diagram of the connecting seat in FIG. 3.
Figure 8B:
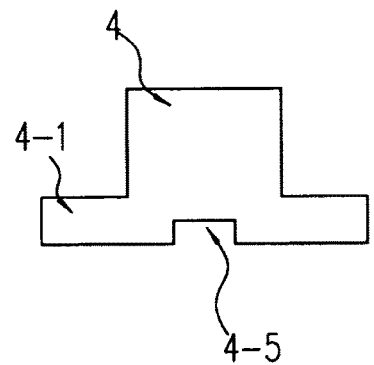

In this embodiment, stretching plates 4-1 are provided on both of lower sides of the connecting seat 4 (as shown in FIG. 8*a* and FIG. 8*b*). Installation holes 4-2 matching with the multi-shaft fine tuning rack 11 are disposed on the stretching plates 4-1. However, a connecting plate 4-3 is provided on the right side of the connecting seat 4, which is used to connect with the clamping seat 1. The connecting plate 4-3 has four down-up stepped holes 4-4 matching with the screw holes 1-5. A sliding groove 4-5 is arranged on the bottom of the connecting seat 4, and the sliding groove 4-5 joins with the sliding rail (not shown) on the plane of the multi-shaft fine tuning rack 11.

Figure 9:
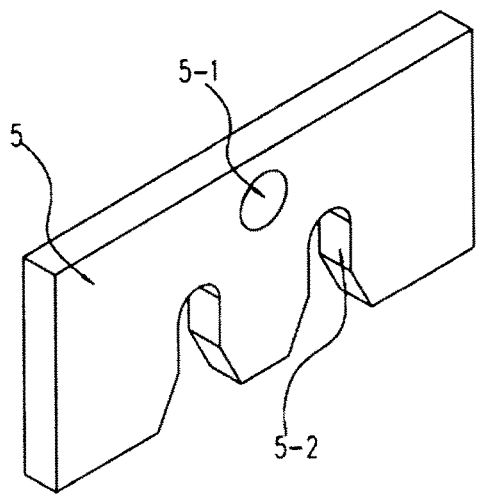
FIG. 9 is the structural schematic diagram of the fiber optic patch cord limit plate in FIG. 3.

In this embodiment, the fiber optic patch cord limit plate 5 (as shown in FIG. 9) is a square plate. An installation hole 5-1 is arranged on the upper side of the fiber optic patch cord limit plate 5, and is used to fix with the clamping seat 1. Two inverted U-shaped bayonets 5-2 are arranged on the lower side of the fiber optic patch cord limit plate 5, and are used to install the optical fiber fiber optic patch cord 6.

Figure 10:
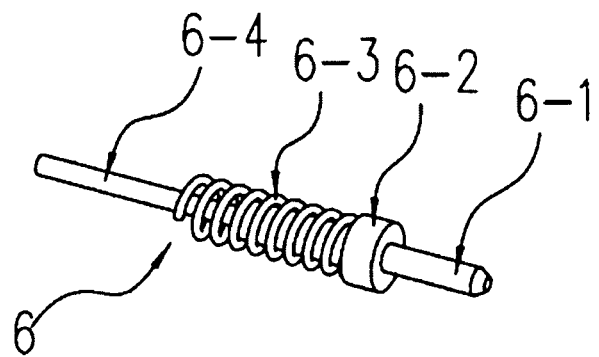
FIG. 10 is the structural schematic diagram of the fiber optic patch cord in FIG. 3.

In this embodiment, the fiber fiber optic patch cord 6 (as shown in FIG. 10) adopts the LC optical fiber fiber optic patch cord used by conventional clamps, and comprises a metal handle 6-2 and a ceramic rod 6-1. The tail end of the metal handle 6-2 is connected with an optical fiber 6-4. The metal handle 6-2 is sleeved with a spring 6-3.

Figure 11:
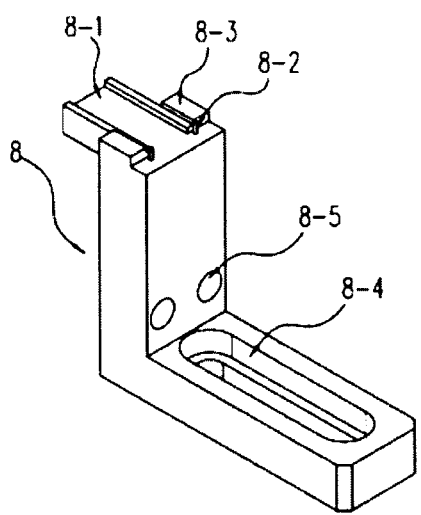
FIG. 11 is the structural schematic diagram of the PCB socket in FIG. 4.
Figure 12:
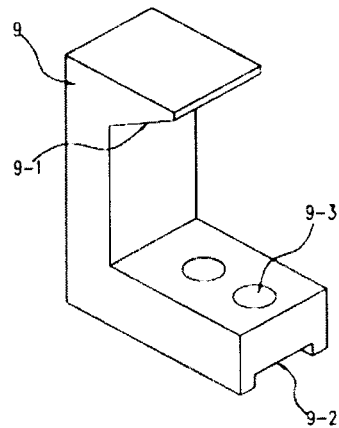
FIG. 12 is the structural schematic diagram of the clamping jaw in FIG. 4.

A PCB socket 8 (as shown in FIG. 11) in FIG. 1, FIG. 2 and FIG. 11 to FIG. 13 is a Z-shaped block, and its upper side is provided with a groove 8-1. Limiting bosses 8-3 are arranged on the both sides of the groove 8-1. A limiting column 8-2 is arranged near the groove 8-1 and beside the limiting boss 8-3 on one side. The bottom of the PCB socket 8 is provided with a horizontal plate (not labeled) having a groove-shaped hole 8-4 with steps. The horizontal plate (not labeled) and the limiting bosses 8-3 are connected by a vertical plate (not labeled) with stepped holes 8-5. In this embodiment, the PCB is placed into the groove 8-1 of the PCB socket 8, and limited by the limiting bosses 8-3 on the both sides. The gas jaw 10 is controlled to close by a gas line routing and to drive the clamping jaw 9 (referring to FIG. 1 and FIG. 2) to shut up. The clamping jaw 9 (as shown in FIG. 12) comprises a wedge clamping 9-1, a groove 9-2 and through holes 9-3, wherein the wedge clamping 9-1 is arranged on the top of the clamping jaw 9 and has an inclined plane. The lower surface (not labeled) on the bottom (based on L-shaped block) of the clamping jaw 9 is provided with the groove 9-2 matching with the gas jaw 10 (see FIG. 1 and FIG. 4), and the upper surface (not labeled) opposite to the lower surface is provided with through holes 9-3 containing the nails running through the lower surface. Referring to FIG. 1 again, the clamping part 1 is fixed on the multi-shaft fine tuning rack 11 by screws. The drive screw (not labeled) of the multi-shaft fine tuning rack 11 is adjusted to drive the plastic lens and the PCB to relatively move forward and backward/left and right/up and down, and to rotate in the forward and backward/left and right/up and down directions.

Figure 13:
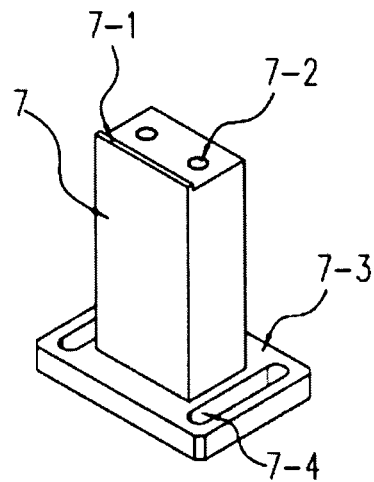
FIG. 13 is the structural schematic diagram of the cushion block of the supporting part in FIG. 1.

The cushion block 7 in FIG. 13 is a square column body. The top of the cushion block 7 is provided with screw holes 7-2 used to connect with the PCB socket 8, and one side of the screw hole is provided with a flange 7-1. The bottom of the cushion block 7 is provided with a positioning plate 7-3, which is perpendicular to the column and has extending parts on its both sides. The extending part is provided a groove-shaped hole 7-4, and the groove-shaped hole 7-4 is penetrated by a screw and joins with a relevant structure of the platform bottom plate 12, so that the cushion block 7 is fixed on the platform bottom plate 12.

What is claimed:

1. A coupling platform of SFP+COB module assembly for photoelectric communication, which comprises a lens clamping part, a PCB clamping part, a coupling adjustment part and a supporting part, wherein the lens clamping part comprises a clamping seat, a movable part, a cam, a connecting seat, a fiber optic patch cord limit plate and a fiber optic patch cord; the PCB clamping part comprises a PCB socket, a clamping jaw and a gas jaw; the main body of the coupling adjustment part is a multi-shaft fine tuning rack; and the supporting part comprises a cushion block and a platform bottom plate, wherein: the clamping seat, the movable part and the cam are combined, thereby enabling the cam to drive the movable part to slide up and down in a clamping groove of the clamping seat during rotation; when the movable part moves to an upper end, an LC light port of a plastic lens can be inserted into the clamping seat without obstruction; when the movable part moves to a lower end, the LC light port of the plastic lens is limited by a limiting gap of the movable part; and when the cam rotates, the cam drives the movable part to slide to the upper end to replace the plastic lens with a new plastic lens, so as to realize cyclic operation.

2. The coupling platform of SFP+COB module assembly for photoelectric communication as claimed in claim 1, wherein: the clamping seat comprises a clamping sliding groove arranged at one side which allows the movable part to slide up and down inside, a stepped hole arranged on the same side which accommodates the LC adapters of the plastic lens to insert inside and to be limited, a through hole arranged on the top which contains the cam inside, and a screw hole arranged on the bottom, and the back of the clamping sliding groove is provided with a screw hole which allows a screw to run through to the fiber optic patch cord limit plate.

3. The coupling platform of SFP+COB module assembly for photoelectric communication as claimed in claim 2, wherein: the movable part is a plate with a round square hole matching with the cam in the middle, the cam will drive the movable part to slide up and down in the clamping sliding groove during rotation, and the limiting gap matches with the stepped hole to limit the plastic lens and comprises a guide corner edge arranged along the edge of the limiting gap.

4. The coupling platform of SFP+COB module assembly for photoelectric communication as claimed in claim 3, wherein: the cam comprises a rotation shaft matching with the through hole, the rotation shaft is provided with a circular lug which is eccentric relative to the rotation shaft, an adjusting gap at the right end relative to the circular lug, the adjusting gap is provided with a wrench, and a clamping groove is arranged at the other end of the rotation shaft that is away from the adjusting gap.

5. The coupling platform of SFP+COB module assembly for photoelectric communication as claimed in claim 4, wherein: the connecting seat is provided with a stretching plate with an installation hole matching with the multi-shaft fine tuning rack, and a connecting plate used to connect with the clamping seat, wherein the connecting plate is provided with a stepped hole matching with the screw hole on the bottom of the clamping seat, a sliding groove is arranged on the bottom of the connecting seat, and the sliding groove joints with a sliding rail on the plane of the multi-shaft fine tuning rack.

6. The coupling platform of SFP+COB module assembly for photoelectric communication as claimed in claim 5, wherein: an installation hole is arranged on the upper side of the fiber optic patch cord limit plate, and is used to fix with the clamping seat, and an inverted U-shaped bayonet is arranged on the lower side of the fiber optic patch cord limit plate, and is used to install an optical fiber fiber optic patch cord.

7. The coupling platform of SFP+COB module assembly for photoelectric communication as claimed in claim 6, wherein: the optical fiber fiber optic patch cord comprises a metal handle and a ceramic rod, the tail end of the metal handle is connected with an optical fiber, and the metal handle is sleeved with a spring.

8. The coupling platform of SFP+COB module assembly for photoelectric communication as claimed in claim 7, wherein: a groove is arranged on the upper side of the PCB socket, limiting bosses are arranged on both sides of the groove, a limiting column is arranged near the groove and beside the limiting boss on one side, a horizontal plate having a groove-shaped hole with steps is arranged on the lower side of the PCB socket, and the horizontal plate and the limiting bosses are connected by a vertical plate with an stepped hole.

9. The coupling platform of SFP+COB module assembly for photoelectric communication as claimed in claim 8, wherein: the clamping jaw comprises a wedge clamping, a groove and a through hole, wherein the wedge clamping is arranged on the top of the clamping jaw and has an inclined plane, the groove matching with the gas jaw is arranged on the lower surface on the bottom of the clamping jaw, and the upper surface opposite to the lower surface is provided with a through hole containing a nail running through the lower surface.

10. The coupling platform of SFP+COB module assembly for photoelectric communication as claimed in claim 9, wherein: the top of the cushion block is provided with a screw hole used to connect with the PCB socket, one side of the screw hole is provide with a flange, the bottom of the cushion block is provided with a positioning plate with an extending part, the extending part is provided with a groove-shaped hole, and the groove-shaped hole is penetrated by a screw and joins with a relevant structure of the platform bottom plate.

* * * * *